US008719094B1

(12) United States Patent
Klein et al.

(10) Patent No.: US 8,719,094 B1
(45) Date of Patent: May 6, 2014

(54) NOTIFYING A USER OF A PROMOTIONAL OFFER BASED ON A TRAVEL ROUTE

(75) Inventors: Daniel Victor Klein, Pittsburgh, PA (US); Dean Kenneth Jackson, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/572,532

(22) Filed: Aug. 10, 2012

(51) Int. Cl.
*G06Q 30/00* (2012.01)
*G06Q 30/02* (2012.01)

(52) U.S. Cl.
CPC ........ *G06Q 30/0255* (2013.01); *G06Q 30/0261* (2013.01)
USPC .................. 705/14.53; 705/14.58; 705/14.62; 705/14.25

(58) Field of Classification Search
USPC ...................................... 705/14.63
See application file for complete search history.

(56) References Cited

U.S. PATENT DOCUMENTS

| | | | | |
|---|---|---|---|---|
| 8,285,696 | B2* | 10/2012 | Droznin et al. ............... | 707/706 |
| 2002/0095333 | A1* | 7/2002 | Jokinen et al. ................... | 705/14 |
| 2003/0004802 | A1* | 1/2003 | Callegari ........................ | 705/14 |
| 2003/0020623 | A1* | 1/2003 | Cao et al. .................... | 340/686.6 |
| 2004/0117246 | A1* | 6/2004 | Applebaum ...................... | 705/14 |
| 2006/0004631 | A1* | 1/2006 | Roberts et al. ................... | 705/14 |
| 2007/0106468 | A1* | 5/2007 | Eichenbaum et al. ......... | 701/211 |
| 2007/0106565 | A1* | 5/2007 | Coelho ........................... | 705/26 |
| 2008/0154714 | A1* | 6/2008 | Liu et al. ......................... | 705/14 |
| 2009/0234726 | A1* | 9/2009 | Bhandari ......................... | 705/14 |
| 2009/0240590 | A1* | 9/2009 | Or et al. ...................... | 705/14.58 |
| 2010/0088181 | A1* | 4/2010 | Crolley et al. ............... | 705/14.63 |
| 2010/0106603 | A1* | 4/2010 | Dey et al. .................... | 705/14.63 |
| 2010/0153207 | A1* | 6/2010 | Roberts et al. .............. | 705/14.41 |
| 2010/0241496 | A1* | 9/2010 | Gupta et al. .................. | 705/14.1 |
| 2010/0280905 | A1* | 11/2010 | Rothschild .................. | 705/14.63 |
| 2011/0040626 | A1* | 2/2011 | Lin .............................. | 705/14.63 |
| 2011/0078024 | A1* | 3/2011 | Messier et al. .............. | 705/14.63 |
| 2011/0320275 | A1* | 12/2011 | O'Sullivan et al. ......... | 705/14.53 |
| 2012/0303446 | A1* | 11/2012 | Busch ......................... | 705/14.45 |

OTHER PUBLICATIONS

Trademark Electronic Search System (TESS), C, Dec. 26, 2012, United States Patent and Trademark Office.*
Trademark Electronic Search System (TESS), JAVA, Dec. 26, 2012, United States Patent and Trademark Office.*
Trademark Electronic Search System (TESS), Objective-C, Dec. 26, 2012, United States Patent and Trademark Office.*
Trademark Electronic Search System (TESS), Perl, Dec. 26, 2012, United States Patent and Trademark Office.*
Trademark Electronic Search System (TESS), Python, Dec. 26, 2012, United States Patent and Trademark Office.*
Trademark Electronic Search System (TESS), Ruby, Dec. 26, 2012, United States Patent and Trademark Office.*

* cited by examiner

*Primary Examiner* — John G Weiss
*Assistant Examiner* — Kiersten Summers
(74) *Attorney, Agent, or Firm* — McDermott Will & Emery LLP

(57) ABSTRACT

The disclosed subject matter relates to computer-implemented methods for notifying a user of a promotional offer based on a travel route. In one aspect, a method includes determining a travel route, from an origin location to a destination location, of a user. The method further includes calculating a distance from at least one point on the travel route one or more retail locations offering a promotional offer. The method further includes selecting, based on the calculated distance, at least one of the one or more retail locations offering the promotional offer. The method further includes determining a time to notify the user of the promotional offer offered by the selected retail location(s). The method further includes providing for notifying the user at the determined time, of the promotional offer offered by the selected retail location(s).

23 Claims, 5 Drawing Sheets

NOTIFYING A USER OF A PROMOTIONAL OFFER BASED ON A TRAVEL ROUTE

BACKGROUND

The Global Positioning System ("GPS") is a navigation system that provides location information to devices. GPS-based navigation devices can receive GPS signals from GPS satellites, and can determine based on the received GPS signals, their current location on earth. Based on the determined current location, navigation instructions to a destination location can be calculated for GPS based navigation devices.

SUMMARY

The disclosed subject matter relates to a computer-implemented method for notifying a user of a promotional offer based on a travel route. The method includes determining a travel route, from an origin location to a destination location, of a user. The method further includes calculating a distance from at least one point on the travel route to one or more retail locations offering a promotional offer. The method further includes selecting, based on the calculated distance, at least one of the one or more retail locations offering the promotional offer. The method further includes determining a time to notify the user of the promotional offer offered by the selected retail location(s). The method further includes providing for notifying the user at the determined time, of the promotional offer offered by the selected retail location(s).

The disclosed subject matter further relates to a system for notifying a user of a promotional offer based on a travel route. The system includes a memory which includes instructions for notifying a user of a promotional offer based on a travel route, and a processor. The processor is configured to execute the instructions to determine a travel route, from an origin location to a destination location, of a user. The processor is further configured to calculate a distance from at least one point on the travel route to one or more retail locations offering a promotional offer. The processor is further configured to select, based on the calculated distance, at least one of the one or more retail locations offering the promotional offer. The selection includes comparing the calculated distance to a threshold value which is adjustable based on the user's historical deviation data. The user's historical deviation data is determined based on location data received from a location-aware device associated with the user. The processor is further configured to determine a time to notify the user of the promotional offer offered by the selected retail location(s). The processor is further configured to provide for notifying the user at the determined time, of the promotional offer offered by the selected retail location(s).

The disclosed subject matter further relates to a machine-readable medium including machine-readable instructions for causing a processor to execute a method for notifying a user of a promotional offer based on a travel route. The method includes determining a travel route, from an origin location to a destination location, of a user. The method further includes calculating a distance from at least one point on the travel route one or more retail locations offering a promotional offer. The method further includes selecting, based on the calculated distance, at least one of the one or more retail locations offering the promotional offer. The method further includes determining a time to notify the user of the promotional offer offered by the selected retail location(s). The method further includes providing for notifying the user at the determined time, of the promotional offer offered by the selected retail location(s).

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Merchants attempt to target their advertising and promotional offers at consumers most likely to conduct business with them. For example, many merchants send promotional offers via mail to consumers' homes. E-commerce companies operating "flash sale" and "deal of the day" websites assist merchants in targeting consumers. These companies allow a consumer to create an account by providing an email address and the name of the city in which the consumer resides. The e-commerce company then proceeds to send offers via email to the consumer (e.g., each day). In larger cities, this approach is less effective because a consumer who resides in the specified city but may live and/or work at a great distance from the specific location offering a promotional offer. Thus, many of the offers received by the consumer are not of interest to the consumer.

Another approach taken to target consumers has been to provide local offers. In such an approach, a consumer's current location is used to provide promotional offers from merchants located in the vicinity of the consumer. Because this approach relies on a consumer's current location, may provide ineffective offers. For example, a consumer who is currently dining, or has just dined at a restaurant will likely not be interested in receiving offers from restaurant locations near that restaurant.

Thus, it may be desirable to have a system and method for notifying a consumer of a promotional offer at a time and/or location when they are most likely to be of interest to the consumer. This document describes systems and techniques for notifying a user of a promotional offer based on a travel route.

The proposed computer-implemented system and method facilitates notifying a user of a promotional offer based on a travel route. In one aspect of the subject technology, the system determines a travel route, from an origin location to a destination location, of a user. The system calculates, distances from the travel route to various retail locations offering promotional offers. Based on the calculated distances, the system selects one or more retail locations offering promotional offers. The system determines a time to notify the user of the promotional offer offered by the selected retail location(s). The system notifies the user at the determined time, of the promotional offer offered by the selected retail location(s).

Figure 1:
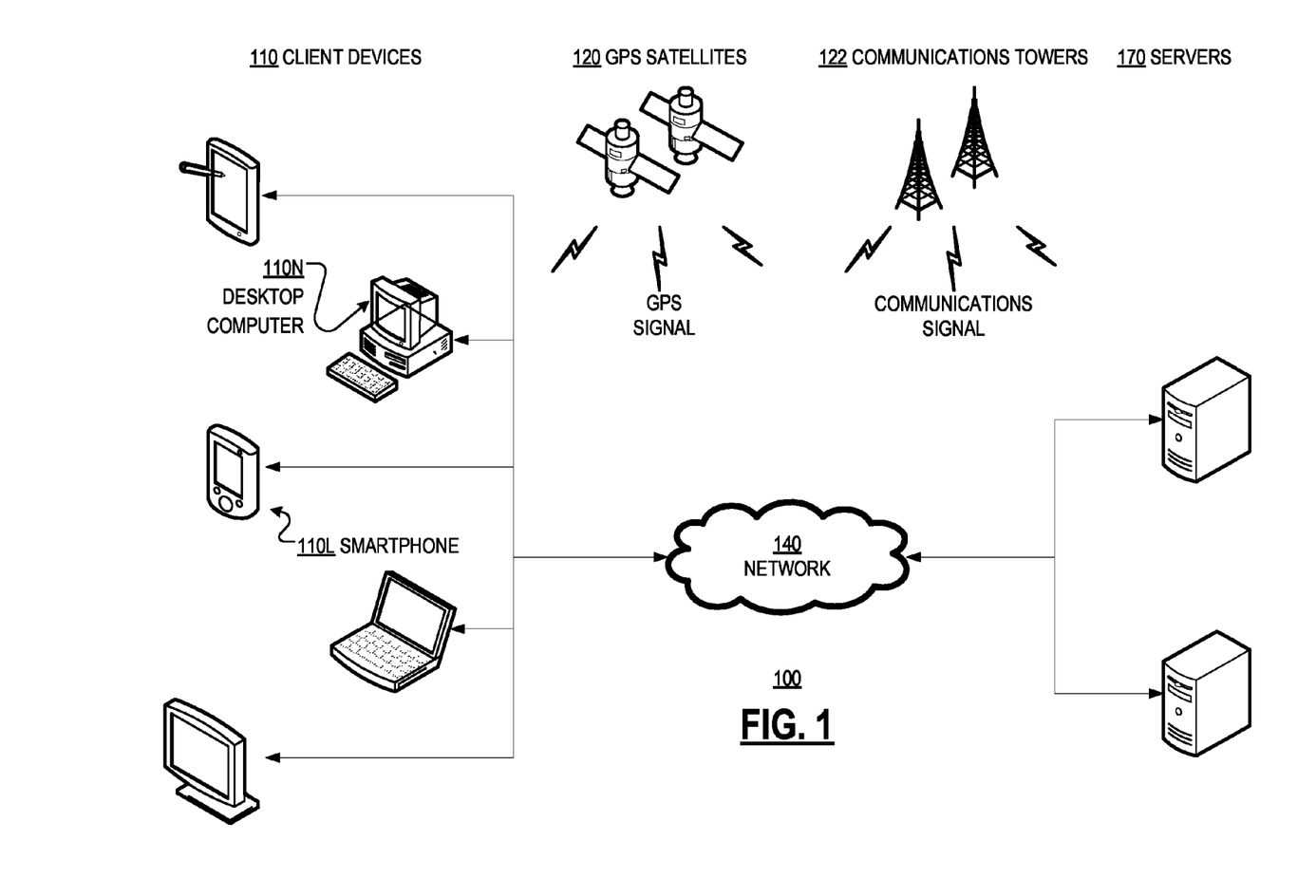
FIG. 1 illustrates an example of an architecture for notifying a user of a promotional offer based on a travel route

FIG. 1 illustrates an example of an architecture 100 for notifying a user of a promotional offer based on a travel route. The architecture 100 includes client devices 110 and servers 170 connected over a network 140.

The client devices 110 can be, for example, mobile computers, tablet computers, mobile devices (e.g., a smartphone or PDA), desktop computers, set top boxes (e.g., for a television), video game consoles, navigation devices (e.g., GPS based navigation devices) or any other devices having appropriate processing capabilities, communications capabilities, and memory. Each client device 110 is configured to include an input device, and an output device to display information to the user.

The client devices 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

Some of the client devices 110 can be location-aware. The term 'location-aware' as used herein encompasses its plain and ordinary meaning, including, but not limited to any device which is capable of determining its location. For example, a smartphone 110L illustrated in FIG. 1 is capable of determining its location based on a GPS signal received from GPS satellites 120. That is, the smartphone 110L may be considered a location-aware client device.

Location-awareness may be achieved through a variety of location-sensing techniques. For example, the smartphone 110L may be capable of determining its location based on techniques involving multi-lateration. The location-sensing techniques may be based on and/or applied to signals received from communications towers 122. Similarly, the smartphone 110L may be capable of determining its location based on IP geolocation techniques.

Location-awareness may be achieved through indirect methods that may not rely on communications signals received from communications towers 122. As an example, a Wi-Fi enabled mobile device (e.g., a smartphone) that is not connected to a communications tower 122 may be able to determine its position based on Wi-Fi broadcast service set identifiers (SSIDs) and/or media access control (MAC) addresses of devices broadcasting the Wi-Fi signals nearby.

While some of the clients 110 (e.g., the smartphone 110L) may be location-aware, other clients 110 may not be location-aware, or may be temporarily unable to determine their location. For example, if the client device does not have the requisite hardware (e.g., a GPS receiver) or the requisite software (e.g., for performing IP geolocation techniques), the client device may be not be location-aware. As an example, a desktop computer 110N illustrated in FIG. 1 may not be location-aware.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for load-balancing) across multiple servers.

The servers 170 are configured to receive location data from location-aware client devices, such as the location-aware smartphone 110L. The location data includes latitude and longitude information. The latitude and longitude information may be exact or approximate.

It should be noted that regardless of how location information is obtained, appropriate efforts may be undertaken to inform the user of the use of that information, and to protect the user's privacy rights.

For example, during the initial signup process, an explanatory notice may be provided to the user, providing notification of the use of location information. Furthermore, in example aspects, the user may be requested to provide explicit consent so that location information is not used unless the user grants permission. Additionally, the user may be notified that the user may withdraw consent at any time.

After the initial signup process, a user may be reminded that the user's location information is being used. For example, the user may be provided periodic reminders (e.g., via email) of the use of the user's location information. Similarly, a visual indicator, e.g., a dot, an arrow, a compass, a bar, or the like, may be displayed within a graphical user interface to indicate to the user that the user's location information is being used.

In addition to the examples provided above, steps may be taken to anonymize and/or encrypt user-specific information such as IP addresses, cookie IDs, location information and the like. Similarly, efforts may be undertaken to limit the retention of, and to allow the user to modify (e.g., alter, delete), the user's location information.

Figure 2:
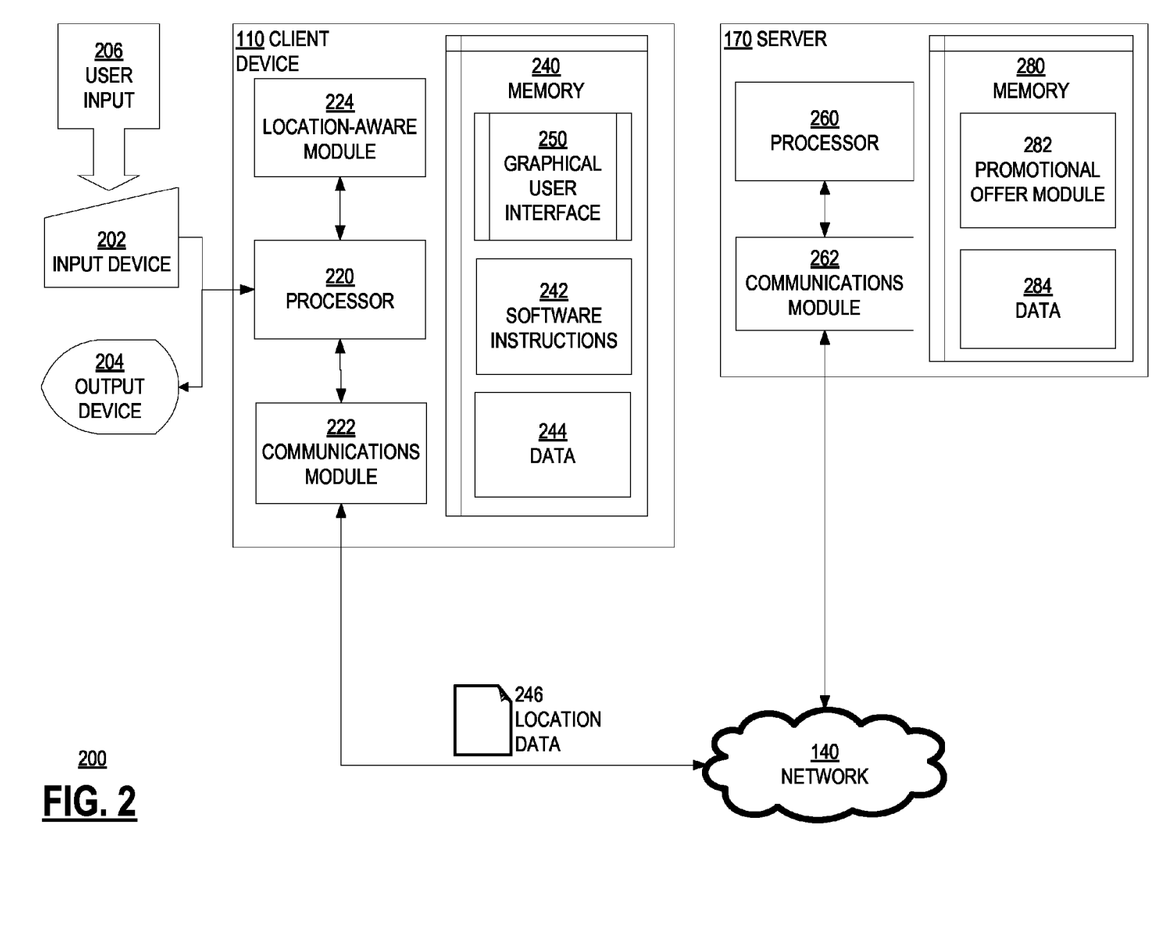
FIG. 2 is a block diagram illustrating an example of a location-aware client device and a server from the architecture of FIG. 1.

FIG. 2 is a block diagram 200 illustrating an example of a location-aware client device 110L and a server 170 in the architecture 100 of FIG. 1 according to certain aspects of the disclosure.

The location-aware client device 110L includes an input device 202, an output device 204, a processor 220, a communications module 222, and memory 240. The input device 202 can be a touchscreen, a mouse, a keyboard, or any other device to enable a user to supply input 206 to the client device 110L. The output device 204 can be a display screen. Input 206 received via the input device 202 can be processed locally on the client device 110 and/or the server 170.

The location-aware client device 110L is connected to the network 140 via a communications module 222. The communications module 222 is configured to interface with the network 140 to send and receive information, such as data (e.g., location data 246), requests, responses, and commands to other devices on the network 140. The communications module 222 can be, for example, a modem or Ethernet card.

The memory 240 includes software instructions 242 and data 244 to enable interaction with the server 170. The memory 240 includes a graphical user interface 250 which allows a user to interact with the location-aware client device 110L, and can be used to display information to the user. The graphical user interface 250 may be installed locally at the location-aware client device 110L and/or downloaded from the server 170.

The location-aware module 224 is capable of determining its geographic location using any one or more techniques. For example, the location-aware module 224 may use a GPS signal received from GPS satellites 120 to determine its location. Similarly, the location-aware module 224 may rely on location-sensing techniques (e.g., based on and/or applied to communications signals received from communications towers 122) to determine its location. The location-aware module 224 can provide location data 246 (e.g., latitude and longitude information) to the server 170.

The server 170 includes a memory 280, a processor 260, and a communications module 262. The memory 280 includes software instructions and data 284 that can be read by the processor 260 to implement a promotional offer module 282 for notifying a user of a promotional offer based on a travel route. The promotional offer module 282 determines a travel route of the user. The travel route is from an origin location to a destination location.

The promotional offer module 282 calculates distances from various points on the travel route to retail locations offering promotional offers. Based on the calculated distance(s), the promotional offer module 282 selects the retail location(s) offering promotional offer(s). The promotional offer module 282 determines a time to notify the user of the promotional offer(s) offered by the selected retail location(s). The promotional offer module 282 provides for notifying the user at the determined time, of the promotional offer(s) offered by the selected retail location(s).

The server 170 is connected to the network 140 via a communications module 262. The communications module 262 is configured to interface with the network 140 to send and receive information, such as data (e.g., location data 246), requests, responses, and commands to other devices on the network 140. The communications module 262 can be, for example, a modem or Ethernet card. As another example, the communications module 262 can be the electronic circuitry that, in a mobile device (e.g., a smartphone), sends and receives information via a voice and/or data network.

The processor 260 of the server 170 is configured to execute instructions, such as instructions physically coded into the processor 260, instructions read from the memory 280, or a combination of both. As an example, the processor 260 of the server 170 executes instructions for notifying a user of a promotional offer based on a travel route.

Once the instructions from the memory 280 are loaded, the processor 260 is configured to determine a travel route of a user. The travel route is from an origin location to a destination location. The processor 260 is further configured to calculate a distance from at least one point on the travel route to one or more retail locations offering a promotional offer. The processor 260 is further configured to select, based on the calculated distance, the retail location(s) offering the promotional offer(s). The processor 260 is further configured to determine a time to notify the user of the promotional offer offered by the selected retail location(s). The processor 260 is further configured to provide for notifying the user of the promotional offer(s) offered by the selected retail location(s).

Figure 3:
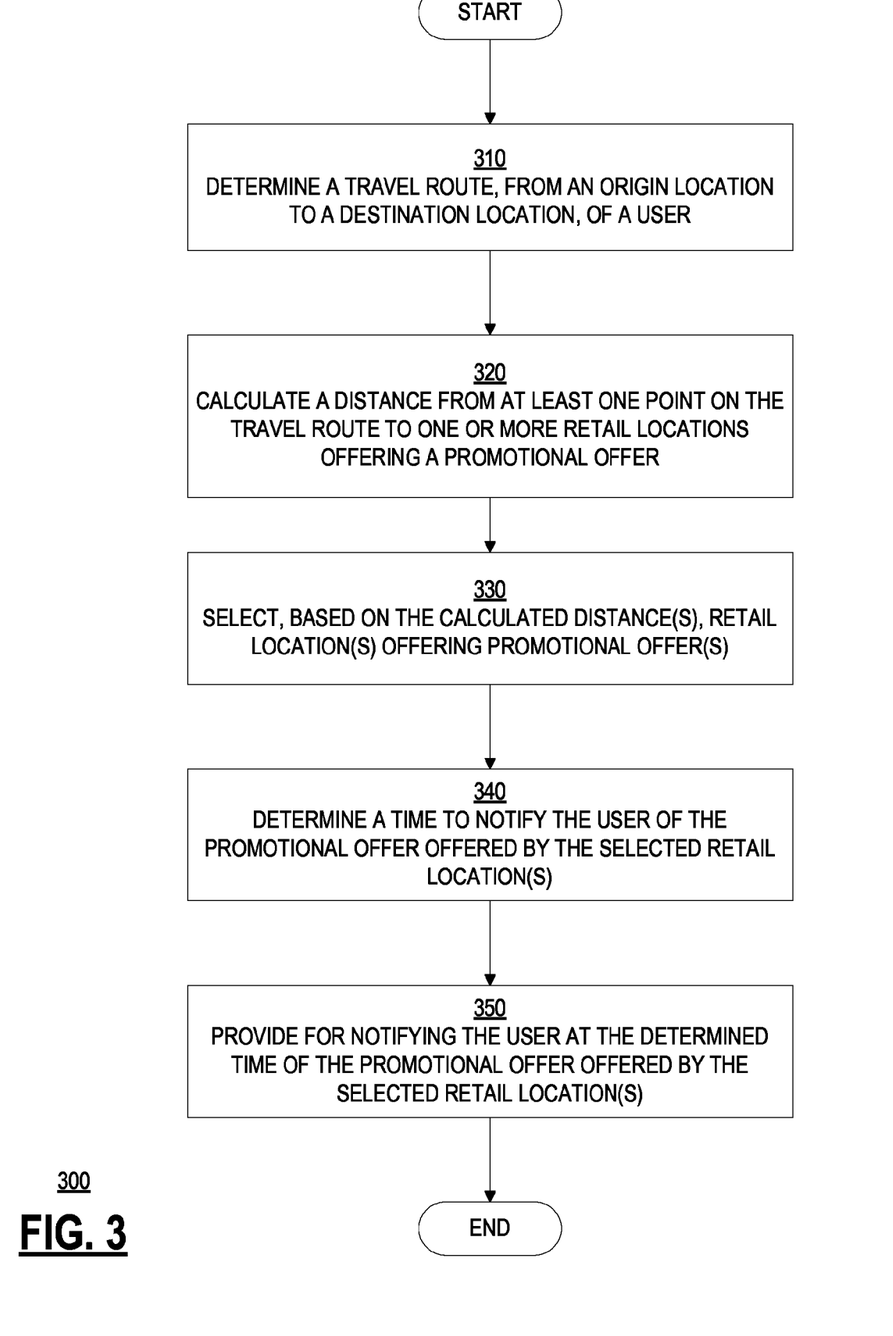
FIG. 3 illustrates an example of a process for notifying a user of a promotional offer based on a travel route.

FIG. 3 illustrates an example of a process 300 for notifying a user of a promotional offer based on a travel route. Although process 300 is described herein with reference to the systems of FIGS. 1 and 2, process 300 is not limited to such, and can be performed by other systems and/or configurations.

In step 310, a travel route of the user is determined. The travel route is from an origin location to a destination location.

The travel route can be a routine travel route which can be determined based on location data 246 is received from a location-aware client device 110L associated with the user. The location data 246 includes latitude and longitude information. Location data may also include time information. The time information may be the time at which the location-aware client device 110L is at a particular location. If time information is not included in the location data 246, a time at which the location data 246 is received by the server 170 is associated with that location data 246.

As a user travels from one location to another, his location-aware client device 110L can detect its current location at a particular time. This current location is received by the system as location data 246, which may include latitude, longitude, and time information.

The location data 246 may be received via the network 140 as it is generated. Alternatively, the location-aware client device 110L may store the location data 246 locally and transmit it in batches. For example, a location-aware client device 110L may transmit the location data 246 at intervals. Similarly, the location-aware client device 110L may transmit location data 246 based on network conditions. For example, the location-aware client device 110L may transmit location data 246 when a network connection exists and/or is more suitable for transmission of location data 246.

In the event that a location-aware client device 110L can not connect directly to the network 140, the location data 246 can be reviewed via an intermediate device. As an example, location data 246 may be received from a GPS-based navigation device installed in an automobile, via an intermediate device such as a smartphone, tablet computer, laptop computer, desktop computer, and so on.

Based on the received location data 246, a routine travel route of the user associated with the location-aware client device 110L is determined. In determining the user's routine travel route(s), designations of certain locations may be received. For example, the user may designate a location as their residence, a location as their workplace, and so on.

The user may also provide his location by performing a 'check-in' associated with that location. The term 'check-in' as it is used herein encompasses its plain and ordinary meaning, including, but not limited to an indication of the user's presence at, and/or the user's affiliation with the location. For example, upon reaching his place of employment, the user may check-in to a designation (e.g., 'Work'), the address of the workplace, or the name of the workplace.

In addition, or as an alternative to utilizing the received designations, the received location data 246 is analyzed in light of the time when the data was collected and/or received by the system. By analyzing the user's location at particular times, the user's routine travel routes can be determined, and designations for various locations can be inferred.

For example, if the location data 246 indicates that the user travels from an origin location to a destination location on weekday mornings, and then remains at that destination location for several hours during the day, this information may be treated as an indication that the origin location is the user's residence and the destination location is the user's workplace.

Similarly, if the location data 246 indicates that the user travels from an origin location to a destination location on weekday evenings, and then remains at that destination location for several hours during the night, this information may be treated as an indication that the origin location is the user's workplace and the destination location is the user's residence.

In analyzing routine travel routes, particular emphasis is placed on frequently visited locations. Furthermore, a designation, which may be inferred or received from the user, is associated with the frequently visited locations. In the preceding example, the frequently visited locations may be designated as the user's residence, and the user's workplace.

To minimize the long-term impact of a frequently visited location, the significance of location data 246 reduces over time. This is referred to as the time-decay aspect of location data 246. Thus, if for example, the user moves from one residence to another, the routine travel route(s) can be updated to reflect the user's new routine travel route(s).

The user's travel route may be determined based on information received partially or wholly from the user. As an example, the user may specify a start location and a destination location to receive travel directions from the start location to the destination location. Using the start location and the destination location, the user's travel route can be determined. Alternatively, the user may specify only the destination location. In such a case, the current location of the location-aware client device 110L may be used to determine the travel route.

The user's travel route may be determined based on information accessible by the server 170. Server-accessible information can include the user's financial transactions, address book, social networks, phone calls, text messages, web browsing history, publicly available information (e.g., Internet websites, public record databases), and any information to which the server 170 has been granted access by the user.

As an example of using server-accessible information to determine a travel route, the server 170 may detect a financial transaction for event tickets from a ticket vendor. The server 170 may access information related to the purchase to determine details of the event, and/or a venue for the event. For example, the server 170 may be able to retrieve information about the event from the provider of payment platform (e.g., a credit card, a web-based purchase system). As another example, the server 170 may be able to obtain details of the event and/or the venue for the event based on an email message. For example, an email message confirming the purchase, and/or an email message mentioning plans for the event may be used. As another example, the user's calendar may be used to determine details of the event and/or the venue for the event.

When the venue for the event is determined, the venue may be used as a destination location for the travel route, an origin location on the travel route, or a point on the travel route. For example, if the user is currently at a location other than the venue, the location of the venue may be used as the destination location.

In step 320, a distance from at least one point on the travel route to one or more retail locations offering a promotional offer is calculated. That is, distances from various points on a travel route to various retail locations offering promotional offers are calculated.

In step 330, based on the calculated distance(s) one or more retail locations offering a promotional offer may be selected. In selecting the retail locations, the server 170 may take various factors into consideration. As an example, the server 170 may determine the amount of time it would take to travel the distance to the retail location.

In selecting particular retail locations, the server 170 may give a different weight (e.g., greater or lesser preference) to locations previously frequented and/or preferred by the user. For example, if the retail location offering the promotional offer is a restaurant that the user has previously dined at, the server 170 may select that restaurant over another retail location offering a promotional offer. The server 170 may also give a different weight (e.g., greater or lesser preference) to retail locations that are associated with other retail locations preferred by the user. For example, if the user prefers to eat at a particular fast food restaurant chain, the server 170 may give greater preference to a retail location of that restaurant chain over another retail location offering a promotional offer.

Another factor in selecting a particular retail location is the user's history of deviating from a travel route. The user's historical deviation data can be used to calculate a threshold value, which can be adjusted based on how often and/or how far the user deviates from a travel route. The user's historical deviation data may be determined based on the location data 246 received from the location-aware client device 110L associated with the user. As an example, if the user enters a specific destination address and while on the way, takes a detour (e.g., to dine at a restaurant), the user's detour may be analyzed by the server 170. For example, the number of miles traveled in the detour may be calculated, the name of the detour location (e.g., the restaurant) may be determined, and/or the time spent in the detour may be calculated.

The user's historical deviation data may be analyzed and/or aggregated over time to determine the threshold value. As an example, if the user typically takes detours of a certain distance (e.g., 5 miles) and/or a certain duration (e.g., 15 minutes) the server 170 may use these values for time and distance to determine the threshold value for the user's historical deviation data.

A user's deviation from a travel route may vary based on a day, time, and/or the travel route. That is, a user may deviate more on certain days and/or times than other days and/or times. Furthermore, the user may deviate more from certain routes than others. Therefore, in addition to a threshold value, the user's threshold values for deviation may be determined with regard to a specific route (e.g., a routine travel route, a route to/from a particular location). Similarly, the user's threshold values for deviation may also take time (e.g., time of day, day of week) into consideration. For example, a user's may deviate more often from a path at certain times (e.g., after leaving work) in comparison to other times (e.g., driving in to work). Therefore, the threshold values for the user's historical deviation data may take into consideration, the specific travel route, the time of day, the day of week, and so on.

The server 170 may select retail locations that are located within a certain distance and/or travel time of a point on the travel route. These threshold values (e.g., of distance and/or travel time) may be configured by the user. For example, the user may specify that he is unwilling to travel (e.g., deviate) for more than a certain distance (e.g., 3 miles) and/or a certain time (e.g., 10 minutes) to take advantage of a promotional offer. The server 170 may use these threshold values to disregard any retail locations that do not meet the user's criteria.

The server 170 may specify and/or adjust the user's threshold values based on the user's historical deviation data. As an example, if the user has not specified a threshold value, and the server 170 determines that the user often deviates from his travel route for up to 5 miles, the server 170 may specify 5 miles as a threshold value for the user. As another example, if the user specifies a threshold value, and the server 170 determines that the user is typically willing to travel more than the specified value, the server 170 may increase the threshold value. Conversely, if the server determines that the user typically does not travel up to the specified value, the server 170 may decrease the threshold value.

In step 340, a time to notify the user of the promotional offer offered by the selected retail location(s) is determined. It should be noted that the promotional offer may be sent from the server 170 at the determined time for display immediately. Alternatively, the promotional offer may be sent from the server 170 for display, after a delay, at the determined time.

The time for notifying the user of the promotional offer is determined within the context of the travel route. For example, when the travel route is a routine travel route (e.g., from the user's residence to the user's workplace), the determined time may be prior to the commencement of the routine travel route. Similarly, the determined time for a specific travel route to a destination location specified by the user may be prior to the commencement of the specific travel route.

When the travel route is to the event venue specified by the user, or determined by the server 170, the time may be determined based on the status of the event. For example, if the server 170 determines that the user has purchased tickets for an event (e.g., a baseball game), the server 170 may use the venue (e.g., a baseball field) as the destination location to calculate the travel route. Then, on the day of the event, the server 170 may provide the promotional offers for retail locations located along the travel route to the venue.

The venue may be determined based on the user's current location. For example, if the server 170 determines, based on the location data 246 and/or other information (e.g., a financial transaction), that the user is at a particular venue (e.g., the baseball field), the server 170 may use the venue as an origin address to calculate the travel route.

The server 170 may also determine the status of the event at the venue to determine the time to notify the user of the promotional offer. As an example, if the server 170 determines that the event at the venue is a baseball game, the server 170 may use the bottom of the ninth inning as the time to notify the user of the promotional offer. As another example, if the server 170 determines that the venue is a theater where the user is watching a play, the server 170 may use the ending time of the play as the time to notify the user of the promotional offer.

The status of the event may be determined based on information retrieved from various server-accessible information sources. For example, the email message confirming the purchase for the event may include a start and/or end times for the event. As another example, the website for the venue may provide information related to the start and/or end time for the event.

The server 170 may also use location data received from other users to determine the status of the event at the venue. For example, the server 170 may detect (e.g., based on location data received from a number of location-aware client devices) that the attendees of the event where the user is in attendance, are beginning to leave the venue. Based on that information, the server 170 may determine that the event has concluded, and use the present time as the time to notify the user of the promotional offer.

In step 350, the server 170 notifies user at the determined time of the promotional offer offered by the selected retail location(s).

The user may be notified of the promotional offer via the location-aware client device 110L. As an alternative, the user may be notified via a secondary (e.g., a display in a car) linked to the location-aware client device 110L.

The user may be notified of the promotional offer through various means of communication. For example, the user may be notified via email and/or text message. As another example, the promotional offers may be included (e.g., on a web page, on a printed page) when the user requests directions for the travel route.

Figure 4:
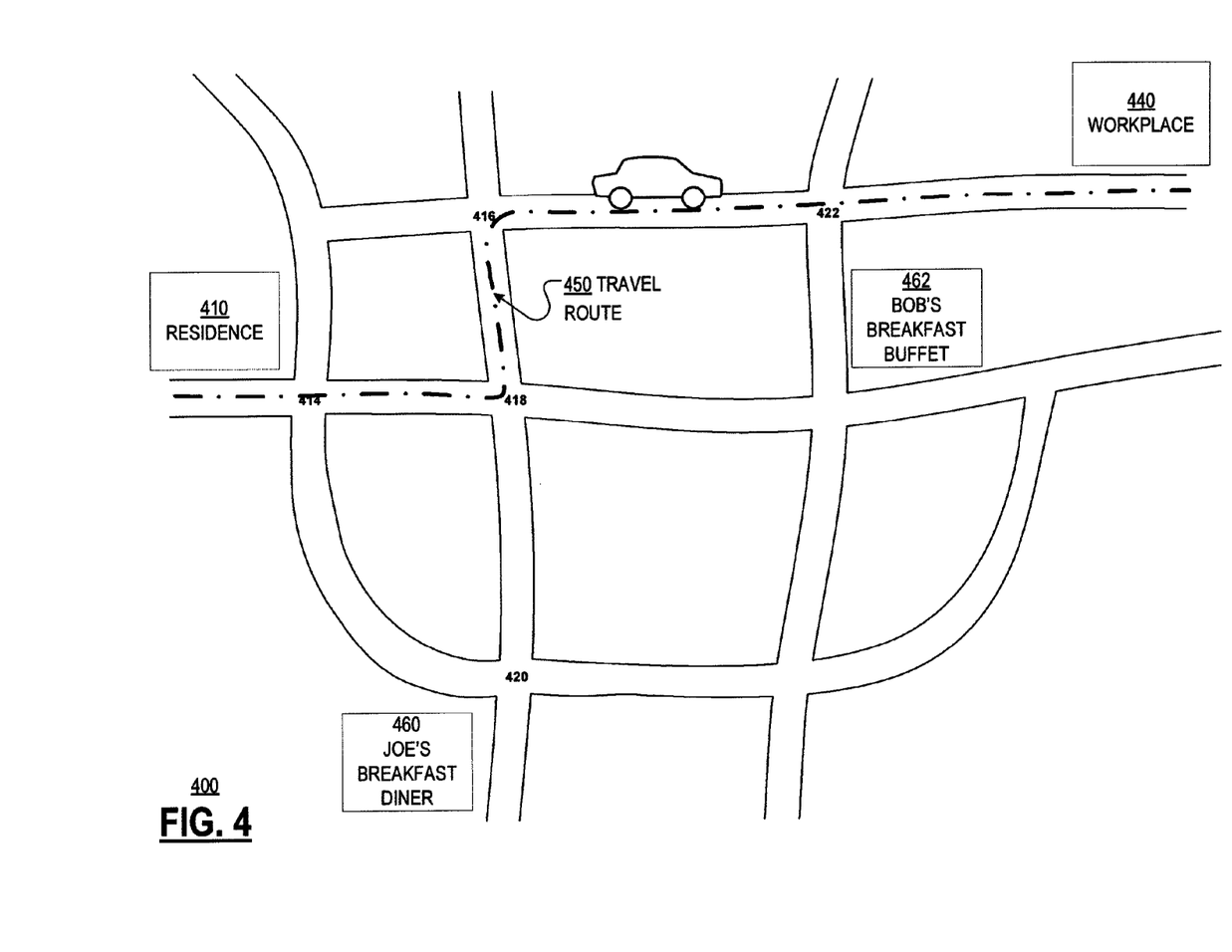
FIG. 4 is an illustration of an example of a system associated with the example of the process of FIG. 3.

FIG. 4 is an illustration of an example associated with the example of the process 300 of FIG. 3. In this example, the user carries with him, a location-aware smartphone 110L. The smartphone 110L can determine its current location based on a GPS signal received from GPS satellites 120. The smartphone 110L is connected to the network 140.

In step 310, a travel route, from an origin location to a destination location, of the user is determined. In this example, the travel route is the user's routine travel route from his residence 410 to his workplace 440. That is, the origin location for this routine travel route is the user's residence 440, and the destination location is the user's workplace 440.

The user has specified designations (e.g., home, work) for his residence 410 and workplace 440. Furthermore, the user often performs check-ins associated with his residence 410 and workplace locations 440 to announce his location. As the user travels from his residence 410 to his workplace 440 on workdays, location data 246 is received at the server 170 from the user's smartphone 110L. In this example, the smartphone 110L is connected to the network 140, and transmits location data 246, as updates are available, to the server 170.

Based on the received location data 246, the server 170 determines the user's routine travel route 450 from his residence 410 to his workplace 440. The user's routine travel route 450 includes route segments 410-414, 414-418, 418-416, 416-422, and 422-440.

The server 170 also determines that the user usually leaves his residence at approximately 7:45 a.m., and reaches his workplace 440 at approximately 8:15 a.m. The server 170 also determines the approximate times at which the user is located at the various points on the routine travel route 450. For example, the server 170 may determine the approximate times that the user passes through points 414, 418, 416, and 422.

The server 170 further determines, based on the received location data 246, that the user often deviates from his routine travel route to stop at Joe's Breakfast Diner 460. The deviation adds an average of two miles and 15 minutes to the user's travel route 450. Based on the average deviations, the server 170 sets the threshold values for the user's historical deviation data for this particular routine travel route 450 at two miles and/or 15 minutes.

In step 320, the server 170 calculates distances to various retail locations offering promotional offers. In this example, Bob's Breakfast Buffet 462 is offering a promotional offer for a breakfast buffet priced at $4.95.

The server 170 calculates distances from the user's routine travel route 450 to Bob's Breakfast Buffet 462. For example, the server 170 calculates the distance from the closest point 420 on the user's travel path 450 to Bob's Breakfast Buffet 462. The server determines that the distance 420-462 would be 1 mile, and that the deviation would add 6 minutes to the total travel time.

In step 330, based on the distance calculated in step 320, the server 170 selects Bob's Breakfast Buffet 460. In selecting Bob's Breakfast Buffet 460, the server 170 determines that the deviation would be within the threshold values of the user's historical deviation data, for example, the user's historical deviation data for the routine travel path 450.

In step 340, the server 170 determines that the time to notify the user of the promotional offer offered by Bob's Breakfast Buffet to be 7:30 a.m., which is prior to 7:45 a.m. when the user routinely leaves for work.

In step 350, the server 170 notifies the user at 7:30 a.m. of the promotional offer for Bob's Breakfast Buffet. In this example, the server 170 notifies the user via a text message sent to the user's smartphone 110L.

Figure 5:
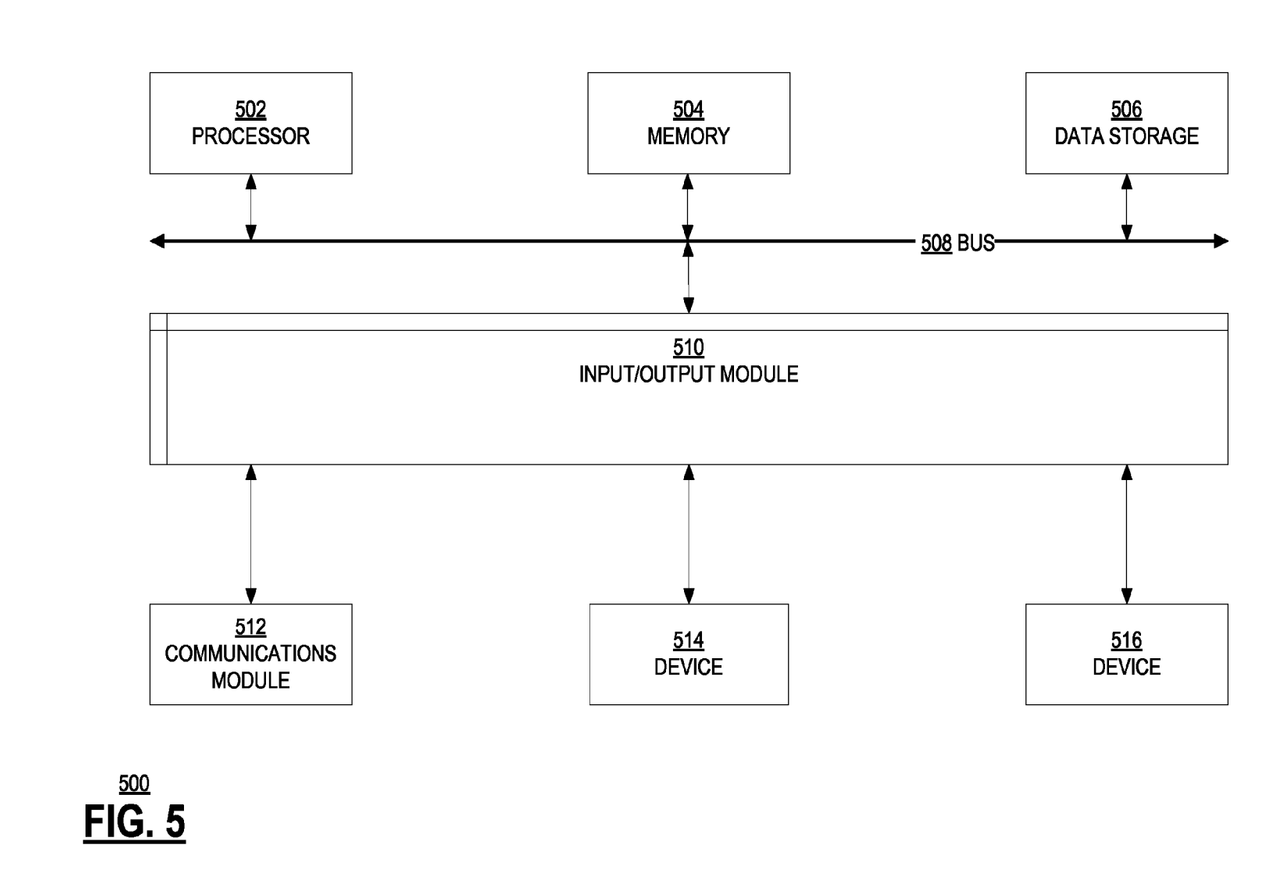
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the client device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C™, OBJECTIVE-C™, C++, Assembly), architectural languages (e.g., JAVA™, .NET), and application languages (e.g., PHP, RUBY™, PERL™, PYTHON™). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the client device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include client devices and servers. A client device and server are generally remote from each other and typically interact through a communication network. The relationship of client device and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for notifying a user of a promotional offer based on a travel route, the method comprising:
   determining a travel route of a user, wherein the travel route is from an origin location to a destination location;
   calculating a distance from at least one point on the travel route to one or more retail locations offering a promotional offer;
   selecting at least one of the one or more retail locations offering the promotional offer, wherein the selecting comprises:
      generating a distance threshold value based on input from the user;
      adjusting the generated distance threshold value based on a historical deviation data of the user; and
      comparing the calculated distance to the adjusted distance threshold value, wherein the at least one of the one or more retail locations is selected based on the comparison of the calculated distance to the adjusted distance threshold value;
   determining, by a processor, a time to notify the user of the promotional offer offered by the selected at least one retail location; and
   notifying the user at the determined time of the promotional offer offered by the selected at least one retail location.

2. The computer-implemented method of claim 1, wherein the destination location is received from the user, and wherein the origin location is at least one of a start location received from the user, or a current location determined based on location data received from a location-aware device associated with the user.

3. The computer-implemented method of claim 1, wherein the travel route is a routine travel route that the user previously traveled, and wherein the routine travel route is determined based on location data received from a location-aware device associated with the user.

4. The computer-implemented method of claim 3, wherein the determined time is prior to the user commencing travel along the routine travel route.

5. The computer-implemented method of claim 1, wherein at least one of the origin location or the destination location comprises a venue for an event, wherein the venue is determined based on a transaction associated with the user.

6. The computer-implemented method of claim 1, wherein at least one of the origin location or the destination location comprises a venue for an event, wherein the venue is determined based on an email message associated with the user.

7. The computer-implemented method of claim 5, wherein the determining of the time is based on a status of the event at the venue.

8. The computer-implemented method of claim 7, wherein the status of the event at the venue is determined based on information retrieved from a news source.

9. The computer-implemented method of claim 7, wherein the status of the event at the venue is determined based on location data received from a plurality of location-aware devices.

10. The computer-implemented method of claim 1, wherein the historical deviation data of the user is determined based on location data received from a location-aware device associated with the user.

11. The computer-implemented method of claim 1, wherein the selected at least one retail location comprises at least one retail location having a calculated distance from the at least one point on the travel route that is (i) greater than the distance threshold value generated based on the user input and (ii) less than the adjusted distance threshold value.

12. The computer-implemented method of claim 1, wherein the selected at least one retail location excludes at least one retail location having a calculated distance from the at least one point on the travel route that is (i) less than the distance threshold value generated based on the user input and (ii) greater than the adjusted distance threshold value.

13. A system for notifying a user of a promotional offer based on a travel route, the system comprising:
a memory comprising instructions for notifying a user of a promotional offer based on a travel route;
a processor configured to execute the instructions to:
determine a travel route of a user, wherein the travel route is from an origin location to a destination location;
calculate a distance from at least one point on the travel route to one or more retail locations offering a promotional offer;
select at least one of the one or more retail locations offering the promotional offer, wherein the selection comprises:
generating a distance threshold value based on input from the user;
adjusting the generated distance threshold value based on a historical deviation data of the user, wherein the historical deviation data of the user is determined based on location data received from a location-aware device associated with the user; and
comparing the calculated distance to the adjusted distance threshold value, wherein the at least one of the one or more retail locations is selected based on the comparison of the calculated distance to the adjusted distance threshold value;
determine a time to notify the user of the promotional offer offered by the selected at least one of the one or more retail locations; and
notify the user at the determined time of the promotional offer offered by the selected at least one retail location.

14. The system of claim 13, wherein the destination location is received from the user, and wherein the origin location is at least one of a start location received from the user, or a current location determined based on location data received from a location-aware device associated with the user.

15. The system of claim 13, wherein the travel route is a routine travel route that the user previously traveled, and wherein the routine travel route is determined based on location data received from a location-aware device.

16. The system of claim 15, wherein the determined time is prior to the user commencing travel along the routine travel route.

17. The system of claim 13, wherein at least one of the origin location or the destination location comprises a venue for an event, wherein the venue is determined based on a transaction associated with the user.

18. The system of claim 17, wherein the determination of the time is based on a status of the event at the venue.

19. The system of claim 18, wherein the status of the event at the venue is determined based on information retrieved from a news source.

20. The system of claim 18, wherein the status of the event at the venue is determined based on location data received from a plurality of location-aware devices.

21. A non-transitory machine-readable storage medium comprising machine-readable instructions for causing a processor to execute a method for notifying a user of a promotional offer based on a travel route, the method comprising:
determining a travel route of a user, wherein the travel route is from an origin location to a destination location;
calculating a distance from at least one point on the travel route to one or more retail locations offering a promotional offer;
selecting at least one of the one or more retail locations offering the promotional offer, wherein the selecting comprises:
generating a distance threshold value based on input from the user;
adjusting the generated distance threshold value based on a historical deviation data of the user; and
comparing the calculated distance to the adjusted distance threshold value, wherein the at least one of the one or more retail locations is selected based on the comparison of the calculated distance to the adjusted distance threshold value;
determining a time to notify the user of the promotional offer offered by the selected at least one retail location; and
notifying the user at the determined time of the promotional offer offered by the selected at least one retail location.

22. The non-transitory machine-readable storage medium of claim 21, wherein the travel route is a routine travel route that the user previously traveled, wherein the routine travel route is determined based on location data received from a location-aware device associated with the user, and wherein the determined time is prior to the user commencing travel along the routine travel route.

23. The non-transitory machine-readable storage medium of claim 21, wherein at least one of the origin location or the destination location comprises a venue for an event, wherein the venue is determined based on a transaction associated with the user, wherein the determining of the time is based on a status of the event at the venue, and wherein the status of the event at the venue is determined based on at least one of information retrieved from a news source or location data received from a plurality of location-aware devices.

* * * * *